United States Patent
Gaarde et al.

(10) Patent No.: US 6,816,657 B2
(45) Date of Patent: Nov. 9, 2004

(54) RAMAN FIBER OPTIC AMPLIFIER WITH REDUCED DISPERSION

(75) Inventors: Peter Gaarde, Valby (DK); Lars Gruner-Nielsen, Broenshoej (DK); Bera Palsdottir, Koebenhavn (DK)

(73) Assignee: Furukawa Electric North America, Inc., Norcross, GA (US)

( * ) Notice: Subject to any disclaimer, the term of this patent is extended or adjusted under 35 U.S.C. 154(b) by 331 days.

(21) Appl. No.: 10/140,696

(22) Filed: May 8, 2002

(65) Prior Publication Data

US 2003/0210876 A1 Nov. 13, 2003

(51) Int. Cl.$^7$ .............................. G02B 6/16; G02B 6/02
(52) U.S. Cl. ....................................................... 385/123
(58) Field of Search ................ 385/123–128; 359/341.01

(56) References Cited

U.S. PATENT DOCUMENTS

| | | | |
|---|---|---|---|
| 4,852,968 A | * | 8/1989 | Reed ........................... 385/127 |
| 5,673,354 A | | 9/1997 | Akasaka et al. |
| 6,498,887 B1 | * | 12/2002 | Gruner-Nielsen et al. .. 385/123 |

FOREIGN PATENT DOCUMENTS

| EP | 1054275 | 11/2000 |
|---|---|---|
| EP | 1176742 | 1/2002 |
| JP | 2002062450 | 2/2002 |

OTHER PUBLICATIONS

S. P. Survaiya, et al., Dispersion Characteristics of an Optical Fiber Having Linear Chirp Refractive Index Profile, J. Lightwave Tech., v. 17, No. 10 (Oct. 1999).
EPO Search Report, EP Application No. 02020438.4 (Apr. 28, 2003) (3 pages).

* cited by examiner

Primary Examiner—Nimeshkumar D. Patel
Assistant Examiner—Sumati Krishnan
(74) Attorney, Agent, or Firm—Law Office of Leo Zucker

(57) ABSTRACT

A pumped Raman fiber optic amplifier includes two optical fibers whose lengths are determined so that the fibers exhibit dispersions of substantially equal magnitude and opposite sign at the wavelength of an input light signal. The fiber having the positive dispersion has a cylindrical core, an outer cladding, and a refractive index profile with respect to the outer cladding. The core has a diameter of between 3 and 6 microns ($\mu$m) and a difference ($\Delta$n) between the index of the core and the cladding is between 0.015 and 0.035. The index profile includes a trench region adjacent the circumference of the core, and the trench region has a width of between 1 and 4 $\mu$m and a $\Delta$n of between –0.005 and –0.015. The two fibers are slope matched so that the net dispersion of the amplifier remains substantially zero over a broad wavelength interval.

16 Claims, 4 Drawing Sheets

RAMAN FIBER OPTIC AMPLIFIER WITH REDUCED DISPERSION

BACKGROUND OF THE INVENTION

1. Field of the Invention

This invention concerns high gain Raman fiber optic amplifiers, and optical fibers suitable for use in such amplifiers.

2. Discussion of the Known Art

Optical fibers having a high concentration of Germanium in their core, for example, fibers wherein the refractive index of the core is more than 0.020 above that of the surrounding cladding (Δn>0.020) and with a small effective area (less than 20 $\mu m^2$), typically achieve good gain when used as media for Raman amplification. For example, such fibers are used as dispersion compensating fibers (DCFs) in commercially available dispersion compensating modules (DCMs). See, e.g., U.S. patent application Ser. No. 10/099,820 filed Mar. 16, 2002, entitled "Raman Amplified Dispersion Compensating Modules", which application is assigned to the assignee of the present application and invention.

Amplifiers that use fibers exhibiting high Raman gain are generally viewed as a means for achieving a high and flat gain characteristic in multiple wavelength intervals, limited only by the associated pump configuration. When comparing Raman amplifiers and Erbium doped fiber amplifiers (EDFAs), the lengths of gain fiber required for the respective amplifiers differ greatly. For example, only a few tenths of a meter of fiber is needed for an EDFA while several kilometers of fiber are typically required in a Raman amplifier. Because of this, a typical Raman amplifier is likely to introduce some significant dispersion and dispersion slope when placed in a communication system.

While an EDFA may introduce little dispersion to a communication system, the amplifier only provides gain in wavelength intervals of about 1528 to 1565 nm and 1570 to 1615 nm. A Raman amplifier, however, is capable of operation over many wavelength intervals, being limited only by the available pump configuration. Specifically, the gain region of a Raman amplifier is at a wavelength about 100 nm longer than the pump wavelength. Thus, if gain is needed at 1500 nm, setting a pump wavelength at about 1400 nm would enable a Raman amplifier to provide the required gain.

It is also generally known that a "zero" net dispersion may be achieved by combining fibers having equal positive and negative dispersions, respectively, at the wavelengths of concern. Such technique is used in modern optical communication systems wherein a positive dispersion of a transmission fiber is compensated by a fiber with negative dispersion in a slope matching dispersion compensating module (DCM). But a fiber pair having a neutral overall dispersion comprising a typical transmission fiber and a slope matching DCM, would not be an effective Raman amplifier since the length of the transmission fiber must be many times greater than the length of the module fiber. Also, typical transmission fibers are poor media for Raman amplification since they have low modal Raman gain coefficients (0.4 to 0.7 1W/km) and effective areas above 50 $\mu m^2$. For common transmission fibers the required length would be about 7 times greater than the length of the module DCF. For dispersion shifted fibers such as e.g., Truewave® fiber available from OFS Fitel, the required length would be about 25 times greater than that of the DCF.

A DCM available from OFS Fitel employs a dispersion compensating fiber known as RightWave® DK fiber. The RightWave DK fiber exhibits a negative dispersion slope which compensates about 65% of the dispersion slope of a conventional single mode fiber, with dispersion values available as low as −2040 ps/nm at 1550 nm.

Dispersion tolerances of modern optical communication systems are extremely narrow. Accordingly, a Raman fiber optic amplifier which obtains high gain with substantially zero net dispersion over a wide bandwidth when placed in a communication system, would be highly desirable.

SUMMARY OF THE INVENTION

According to the invention, an optical fiber suitable for use as a gain fiber in a Raman fiber optic amplifier includes a generally cylindrical core, an outer cladding, and a refractive index profile with respect to the outer cladding. The core has a diameter of between 3 and 6 microns ($\mu$m) and a difference (Δn) between the index of the core and the outer cladding is between 0.015 and 0.035. The index profile includes a trench region adjacent the circumference of the core, and the trench region has a width of between 1 and 4 $\mu$m and a relative index of between −0.005 and −0.015.

According to another aspect of the invention, a Raman fiber optic amplifier includes a first fiber having a signal input end and an output end opposite the signal input end, a second fiber having a signal output end and an input end opposite the signal output end, wherein the input end is spliced or coupled to the output end of the first fiber, and a pump light source coupled to the first and the second fibers in such manner as to achieve Raman amplification with respect to a light signal applied to the signal input end of the first fiber and output from the signal output end of the second fiber. Lengths of the first and the second fibers are determined so that the fibers exhibit dispersions of substantially equal magnitude and opposite sign at a wavelength of the light signal. The fiber having a positive dispersion includes a generally cylindrical core, an outer cladding, and a refractive index profile with respect to the outer cladding. The core has a diameter of between 3 and 6 microns ($\mu$m) and a Δn of between 0.015 and 0.035. The index profile includes a trench region adjacent the circumference of the core, and the trench region has a width of between 1 and 4 $\mu$m and a Δn of between −0.005 and −0.015.

For a better understanding of the invention, reference is made to the following description taken in conjunction with the accompanying drawing and the appended claims.

DETAILED DESCRIPTION OF THE INVENTION

Figure 1:
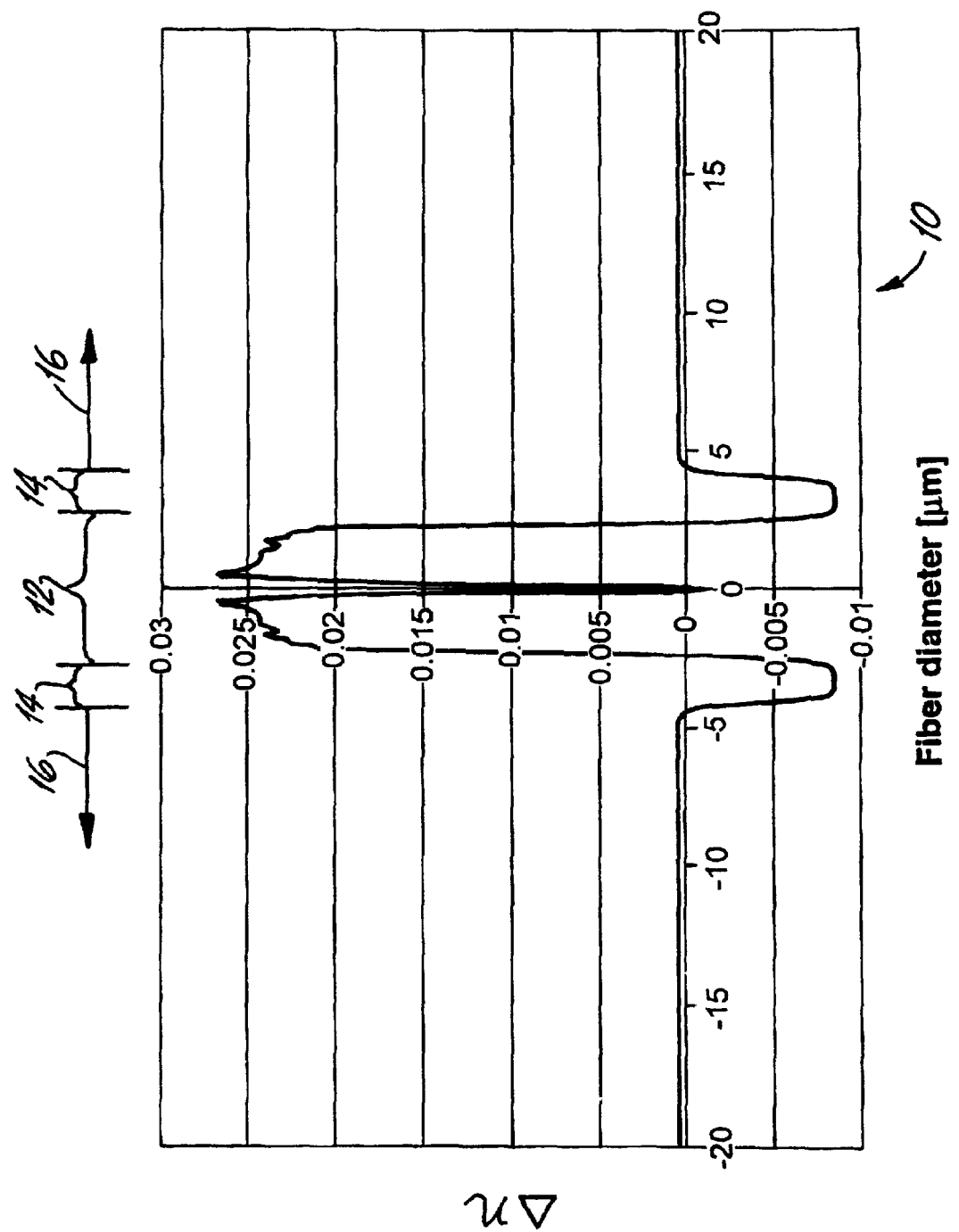
FIG. 1 is an index of refraction profile of a Raman gain fiber according to the invention, showing a difference between the index of refraction through a cross section of the fiber core and a surrounding cladding.
Figure 2:
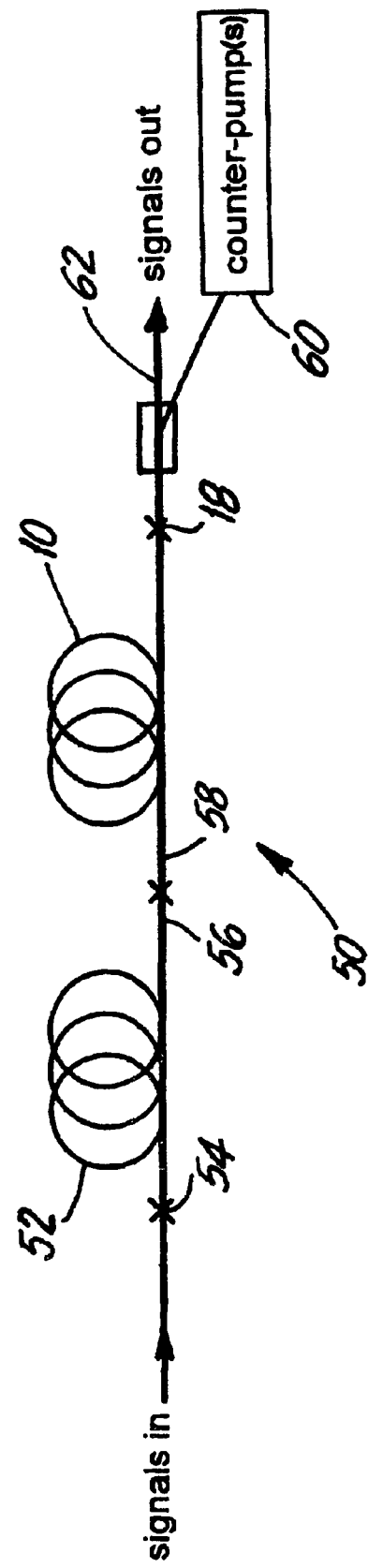
FIG. 2 shows a Raman fiber optic amplifier configuration according to the invention.

FIG. 1 is a graph illustrating a refractive index profile through a cross section of an optical fiber 10 according to the invention. The y-axis plots Δn, i.e., the difference between the refractive index as measured through a cross section of a core 12 of the fiber 10 and a surrounding cladding 16, as a function of position in the cross section measured along the x-axis of the graph. The fiber 10 has a high Raman gain coefficient, positive dispersion, and a dispersion slope suitable to match an existing fiber such as, for example, the mentioned RightWave DK fiber which has a negative dispersion. FIG. 2 shows a Raman amplifier 50 according to the invention, including the present fiber 10 and a determined length of an existing negative dispersion fiber such as RightWave® DK fiber, wherein the total dispersion of the amplifier 50 approaches or becomes substantially zero.

The fiber 10 was produced using a modified chemical vapor deposition (MCVD) process to obtain the following features:

1. High Raman gain coefficient.
2. Positive dispersion, i.e., around 10 to 12 ps/nm/km at 1550 nm.
3. Relative dispersion slope (RDS) such as to match a typical DCF (e.g., RightWave DK fiber).
4. Good spectral properties in both pump- and signal-bands, i.e., low spectral attenuation from 1400 to 1650 nm.
5. Low bending loss, and cutoff wavelength below 1400 nm.

As mentioned, the fiber 10 exhibits the refractive index profile in FIG. 1. Specifically, the core 12 of the fiber 10 has a Δn of about 0.0236, and a diameter of about 4.68 microns ($\mu$m). A trench region 14 adjacent the core has a negative Δn of about −0.0085, and the overall diameter of the core 12 and the trench region 14 is about 8.10 $\mu$m (i.e., the width of the trench region 14 is (8.10−4.68)/2=1.71 $\mu$m). The outer cladding 16 of the fiber 10 has an overall diameter of about 125 $\mu$m.

The core 12 of the fiber 10 therefore has a high Δn (>20*10$^{-3}$) and a narrow diameter. The trench region 14 is thin and deeply depressed with a Δn of about −9*10$^{-3}$. Without the trench region 14, the fiber 10 would exhibit less positive dispersion and have a RDS of about 0.0085 ps$^{-1}$. Providing the trench region 14 thus serves to reduce the effective area of the fiber 10, increase its dispersion, and reduce its RDS so that the fiber can be well matched to the mentioned RightWave DK fiber.

The fiber 10 manufactured with the above specifications exhibited the following properties:

| | |
|---|---|
| Cutoff wavelength | <1400 nm |
| Effective Area @ 1550 nm | 17 $\mu$m$^2$ |
| Modal Raman gain (pump wavelength: 1453 nm) | 2.7 1/W/km |
| Attenuation @ 1550 nm | 0.45 dB/km |
| PMD | <0.1 ps |
| Dispersion @ 1550 nm | 11–12 ps/nm/km |
| Dispersion slope @ 1550 nm | 0.033 ps/nm$^2$/km |
| Relative dispersion slope @ 1550 nm | 0.0027 nm$^{-1}$ |
| 1 dB wavelength | >1700 nm |
| Zero dispersion wavelength | <1200 nm |

In order for the fiber 10 to maintain the above properties, it is preferred that the geometry of the fiber be held substantially within the following bounds:

| Region | Dimension | Index Difference to Outer Cladding (Δn) |
|---|---|---|
| Core 12 | Diameter = 3 to 6 $\mu$m | 0.015 to 0.035 |
| Trench 14 | Width = 1 to 4 $\mu$m | −0.005 to −0.015 |
| Outer Cladding 16 | Width = 62.5 $\mu$m | 0 |

Combining a length of the present fiber 10 with an available dispersion compensating fiber such as RightWave DK fiber having negative dispersion, the Raman amplifier configuration 50 in FIG. 2 obtained substantially zero net dispersion and dispersion slope. As shown in the table above, at 1550 nm the dispersion of the Raman gain fiber 10 is 12 ps/nm/km, while the DK fiber has a dispersion of around −100 ps/nm/km. Thus, if one uses 8 to 10 times as much Raman gain fiber 10 as the DK fiber in a Raman amplifier configuration, the total dispersion at 1550 nm is zero. Further, the relative dispersion slopes at 1550 nm for the present fiber 10 and the DK fiber are equal, resulting in zero total dispersion slope at 1550 nm. As an added feature, the DK fiber is also an excellent gain medium for Raman amplification.

EXAMPLE

The Raman amplifier 50 in FIG. 2 was constructed with 5000 meters of the present fiber 10, and 560 meters of a negative dispersion compensating fiber 52 for which RightWave DK fiber was used. Providing greater lengths of the fibers might attain the same net gain with less pump power, but will also result in higher multi-path interference (MPI) due to increased double Rayleigh back scattering.

An input signal enters one end 54 of the fiber 52, an opposite end 56 of which is spliced to one end 58 of the present fiber 10. A pump 60 is arranged in a counter (backward) pump configuration with respect to a signal output end 62 of the fiber 10. The amplifier 50 may, alternatively, be forward (co-) pumped or bidirectionally pumped, if desired.

Test input signal wavelengths were varied over the entire C- and L-bands from 1526 to 1610 nm. With the pump powers and wavelengths given below, an average net gain of 10 dB and a gain ripple of below 0.4 dB were achieved with 60 input channels and a total input power of 0 dBm (0.0167 mW per channel.)

| Pump Wavelength (nm) | Pump Power (mW) |
| --- | --- |
| 1422 | 247 |
| 1435.5 | 173 |
| 1451 | 100 |
| 1466 | 70 |
| 1477 | 72 |
| 1505 | 84 |

Figure 3:
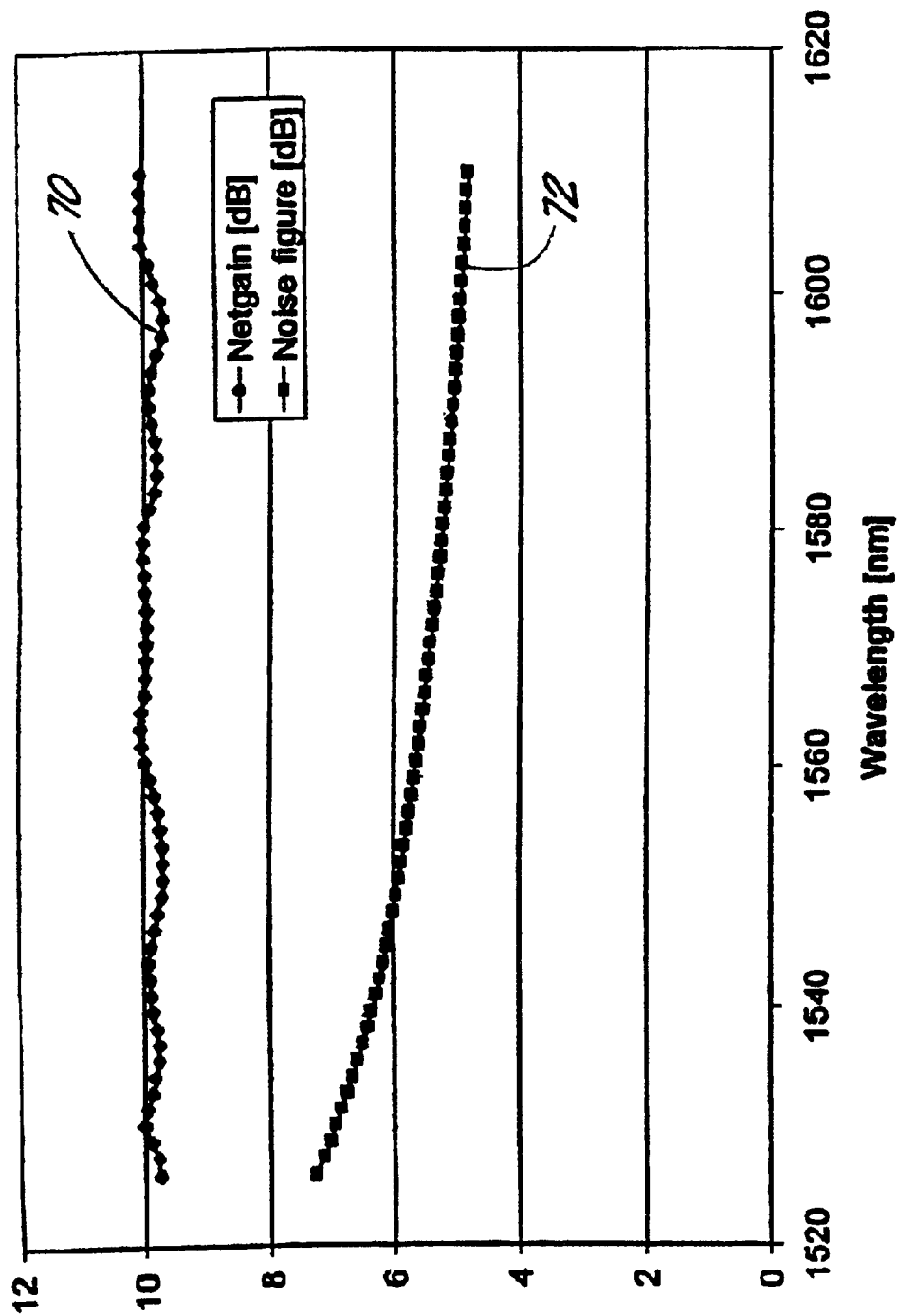
FIG. 3 is a graph showing net gain and noise figure obtained by the amplifier of FIG. 2 as a function of wavelength.

FIG. 3 is a graph in which curve 70 shows net gain and curve 72 shows noise figure in dB for the amplifier 50 in FIG. 2. The average MPI was 44.4 dB.

Figure 4:
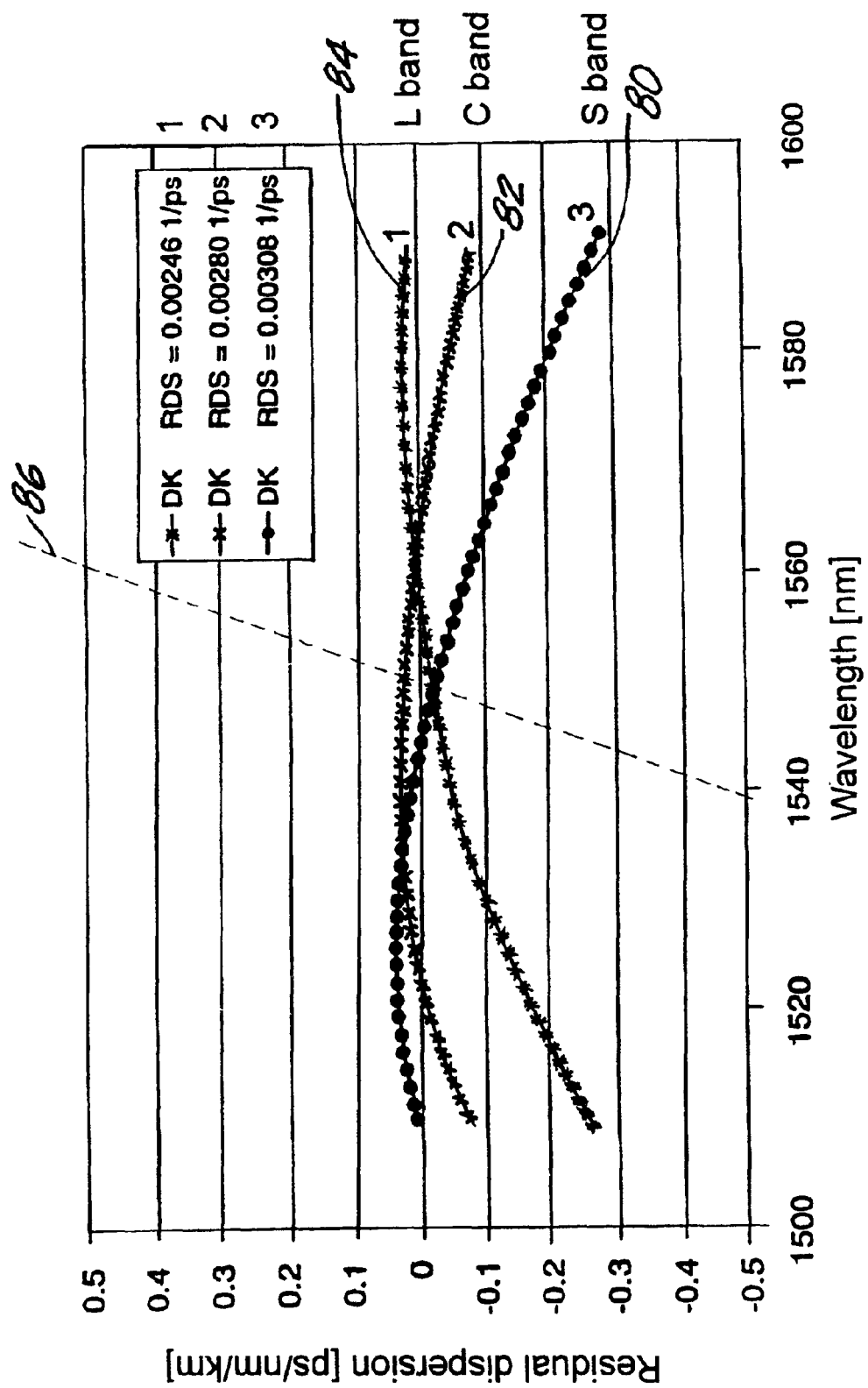
FIG. 4 is a graph showing residual dispersions obtained when combining the fiber of FIG. 1 with dispersion compensating fibers having slightly different relative dispersion slopes (RDSs).

FIG. 4 shows examples where one Raman gain fiber 10 was spliced to three different RightWave DK fibers having slightly varying relative dispersion slopes (RDS) as noted in the figure. Almost zero residual dispersion was obtained in three different wavelength intervals, namely, S-band (curve 80), C-band (curve 82), and L-band (curve 84). Specifically, in C-band the residual dispersion was within ±0.025 ps/nm/km from 1520 to 1570 nm.

By contrast, curve 86 in FIG. 4 shows residual dispersion of a combination of a standard Raman gain fiber produced by OFS Fitel Denmark which has negative dispersion, and a standard transmission fiber having positive dispersion. It is seen that while zero residual dispersion may be obtained at 1550 nm, there remains significant residual dispersion at wavelengths other than 1550 nm because the fibers are not slope matched.

While the foregoing description represents preferred embodiments of the invention, it will obvious to those skilled in the art that various changes and modifications may be made without departing from the spirit and scope of the invention pointed out by the following claims.

We claim:

1. An optical fiber having a generally cylindrical core, an outer cladding, and a refractive index profile with respect to the outer cladding, wherein
    (a) the core has a diameter of between 3 and 6 microns ($\mu$m) and a difference ($\Delta$n) between the refractive index of the core and the outer cladding is between 0.015 and 0.035;
    (b) the index profile includes a trench region adjacent the circumference of the core; and
    (c) wherein the width of the trench region is about 1.71 um and a difference (delta n) between the refractive index of the trench and the outer cladding is between −0.005 and −0.015.

2. An optical fiber having a generally cylindrical core, an outer cladding, and a refractive index profile with respect to the outer cladding, wherein
    (a) the core has a diameter of between 3 and 6 microns ($\mu$m) and a difference ($\Delta$n) between the refractive index of the core and the outer cladding is between 0.015 and 0.035;
    (b) the index profile includes a trench region adjacent the circumference of the core; and
    (c) the trench region has a width of between 1 and 4 um and a difference (delta n) between the refractive index of the trench and the outer cladding is about −0.0085.

3. An optical fiber having a generally cylindrical core, an outer cladding, and a refractive index profile with respect to the outer cladding, wherein
    (a) the core has a diameter of between 3 and 6 microns ($\mu$m) and a difference ($\Delta$n) between the refractive index of the core and the outer cladding is between 0.015 and 0.035;
    (b) the index profile includes a trench region adjacent the circumference of the core; and
    (c) the trench region has a width of between 1 and 4 um and a difference (delta n) between the refractive index of the trench and the outer cladding is between −0.005 and −0.015, and wherein the fiber exhibits a positive dispersion.

4. An optical fiber according to claim 3, wherein the dispersion is between 11 and 12 ps/nm/km at 1550 nm.

5. An optical fiber according to claim 4, wherein the fiber has a relative dispersion slope of about 0.0027 $nm^{-1}$ at 1550 nm.

6. An optical fiber having a generally cylindrical core, an outer cladding, and a refractive index profile with respect to the outer cladding, wherein
    (a) the core has a diameter of between 3 and 6 microns ($\mu$m) and a difference ($\Delta$n) between the refractive index of the core and the outer cladding is between 0.015 and 0.035;
    (b) the index profile includes a trench region adjacent the circumference of the core; and
    (c) the trench region has a width of between 1 and 4 um and a difference (delta n) between the refractive index of the trench and the outer cladding is between −0.005 and −0.015; and wherein the fiber has an effective area of about 17 $um^2$.

7. An optical fiber having a generally cylindrical core, an outer cladding, and a refractive index profile with respect to the outer cladding, wherein
    (a) the core has a diameter of about 4.68 $\mu$m and a difference ($\Delta$n) between the refractive index of the core and the outer cladding is between 0.015 and 0.035;
    (b) the index profile includes a trench region adjacent the circumference of the core; and
    (c) the trench region has a width of between 1 and 4 um and a difference (delta n) between the refractive index of the trench and the outer cladding is between −0.005 and −0.015.

8. An optical fiber having a generally cylindrical core, an outer cladding, and a refractive index profile with respect to the outer cladding, wherein
    (a) the core has a diameter of about 4.68 $\mu$m and a difference ($\Delta$n) between the refractive index of the core and the outer cladding is about 0.0236; and
    (b) the trench region has a width of about 1.71 um and a negative difference (delta n) between the trench and the outer cladding of about −0.0085.

9. An optical fiber according to claim 8, wherein the fiber exhibits a positive dispersion.

10. An optical fiber according to claim 9, wherein the dispersion is between 11 and 12 ps/nm/km at 1550 nm.

11. An optical fiber according to claim 9, wherein the fiber has a relative dispersion slope of about 0.0027 $nm^{-1}$ at 1550 nm.

12. An optical fiber according to claim 8, wherein the fiber has an effective area of about 17 $\mu m^2$.

13. An optical fiber according to claim 8, wherein the outer cladding has an overall diameter of about 125 $\mu$m.

14. A Raman fiber optic amplifier including the optical fiber of claim 8.

15. A Raman fiber optic amplifier comprising:

a first fiber having a signal input end and an output end opposite the signal input end;

a second fiber having a signal output end and an input end opposite the signal output end, wherein said input end is coupled to the output end of the first fiber; and a pump light source coupled to the first and the second fibers in such a manner as to achieve Raman amplification with respect to a light signal applied to the signal input end of the first fiber and output from the signal output end of the second fiber;

wherein lengths of the first and the second fibers are determined so that the fibers have substantially equal relative dispersion slopes and exhibit dispersions of substantially equal magnitude and opposite sign at a wavelength of the light signal, the fiber having a positive dispersion comprises a generally cylindrical core, an outer cladding, and a refractive index profile with respect to the outer cladding, and (a) the core has a diameter of between 3 and 6 microns ($\mu$m) and a difference ($\Delta$n) between the refractive index of the core and the outer cladding is between 0.015 and 0.035;

(b) the index profile includes a trench region adjacent the circumference of the core; and (c) the trench region has a width of between 1 and 4 um and a difference (delta n) between the refractive index of the trench and the outer cladding is between −0.005 and −0.015.

16. A Raman fiber optic amplifier according to claim 15, wherein the first and the second fibers have relative dispersion slopes of about 0.0027 nm$^{-1}$ at 1550 nm.

* * * * *